2 Sheets--Sheet 1.

H. D. STARR.

Washing-Machines.

No. 6,213. Reissued Jan. 5, 1875.

WITNESSES
Robert Everett
E. H. Bates

INVENTOR.
Henry D. Starr
Chipman & Fowler & Co.
Attorneys.

2 Sheets--Sheet 2.

H. D. STARR.

Washing-Machines.

No. 6,213 Reissued Jan. 5, 1875.

WITNESSES

Robert Everett

E. H. Bates

INVENTOR

Henry D. Starr

Chipman & Fraser & Co

Attorneys

UNITED STATES PATENT OFFICE.

HENRY D. STARR, OF TEXANA, TEXAS, ASSIGNOR OF ONE-HALF INTEREST TO RICE S. FLOURNOY, OF SAME PLACE.

IMPROVEMENT IN WASHING-MACHINES.

Specification forming part of Letters Patent No. 147,996, dated February 24, 1874; reissue No. 6,213, dated January 5, 1875; application filed July 11, 1874.

*To all whom it may concern:*

Be it known that I, HENRY DANL. STARR, of Texana, in the county of Jackson and State of Texas, have invented a new and valuable Improvement in Washing-Machines; and I do hereby declare that the following is a full, clear, and exact description of the construction and operation of the same, reference being had to the annexed drawings, making a part of this specification, and to the letters and figures of reference marked thereon.

Figure 1:
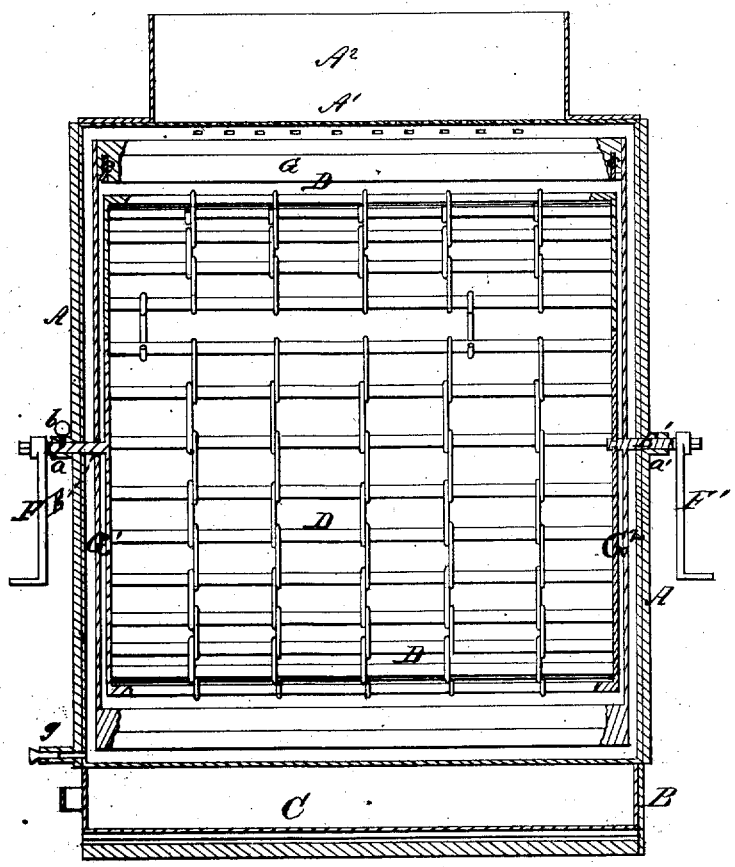
Figure 2:
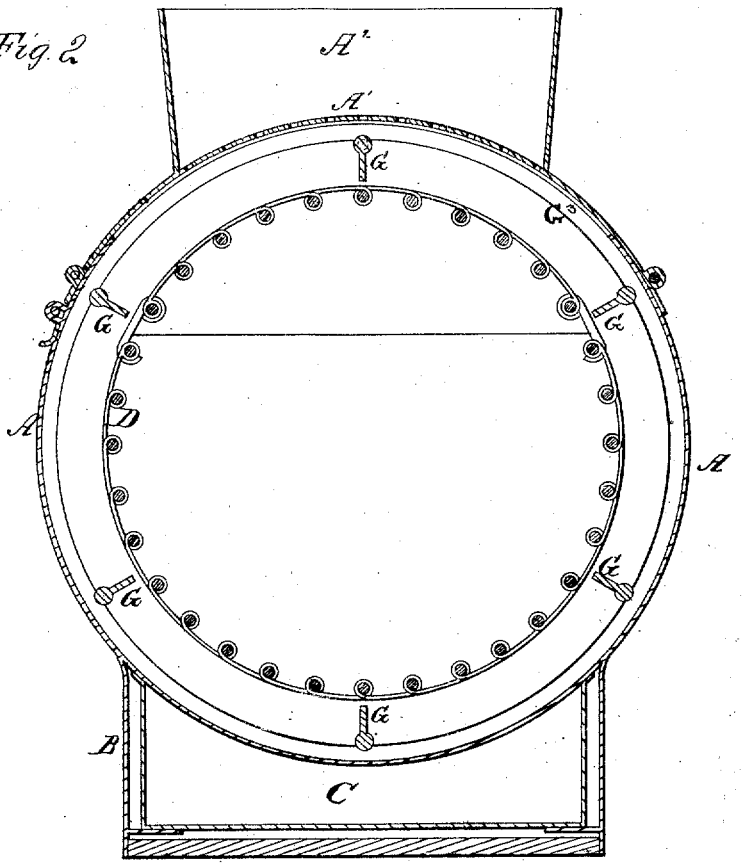

Figure 1 of the drawing is a representation of a longitudinal vertical section of my washer. Fig. 3 is a vertical cross-section of the same.

This invention has relation to washing-machines; and the novelty consists in allowing both cylinder and blades to be rotated or oscillated independently of each other, as will be hereinafter more fully set forth.

In the annexed drawings, A represents a cylindrical drum, which is mounted upon a box, B, containing a drawer, C. This drum has a large opening through its top, which is provided with a perforated hinge-cover, $A^1$, from which rise vertical walls, forming a tray, $A^2$. Inside of the drum A is a cylindrical cage or grated cylinder, D, which is composed of two circular heads united by longitudinal and circular wires, forming large meshes for allowing a free circulation of water through them. This cylinder D has a portion of its grating hinged for the purpose of allowing access to its interior for the introduction and removal of the articles to be cleansed. E $E^1$ are two gudgeons, which pass through long tubular bearings *a a'*, applied centrally to the heads of the drum A, and receive on their ends cranks F F'.

The gudgeon E is rigidly connected to one of the heads of the cylinder D, so that this cylinder can be rotated, by turning the crank F, when a screw, *b*, is loosened. The gudgeon E' affords a bearing for the opposite end of the cylinder D, and allows the latter to turn freely around it.

G G designate blades or buckets, which are secured to two heads, $G^1$ $G^2$, forming an outer cylinder, $G^3$, and the blades are arranged between the grated cylinder and the drum A, at suitable distances apart, and in planes radiating from the axes of said cylinders. One or more of these blades may be connected to their heads by means of hooks and eyes *c c*, which will allow such blades to be removed.

When necessary, the head $G^1$ is allowed to turn freely around the gudgeon E, and the head $G^2$ is permanently secured to the gudgeon $E^1$, so that, by turning the crank F', the gudgeon E being held in its bearing by screw *b*, the heads $G^1$ $G^2$, with their blades G, can be revolved around the grated cylinder D.

The operation for cleansing dishes is as follows: The dishes to be washed are placed inside of the grated cylinder D, it being held stationary by means of the set-screw *b*. A sufficient quantity of hot water is then poured into the drum, at the same time closing the faucet *g* to retain said water in said drum, and turning the crank F' of the blades G to raise the warm water, and dash it upon the dishes to remove the heavy and greasy matter. When the dishes are thus washed the faucet *g* is opened, and the water allowed to escape.

Either hot or cold water is poured into the tray $A^2$, which passes through the perforated bottom $A^1$ in uniform sprays or showers for the purpose of rinsing and cleansing them.

For the purpose of washing fabrics, the screw *b* is loosened to allow both the grated cylinder and the outer cylinder to be rotated independently of each other, the fabrics being in the grated cylinder.

I am aware that a vessel provided with a strainer or tray, and a rotating wheel for distributing the water introduced through the strainer upon dishes situated on racks has heretofore been employed for the purpose of washing dishes; and I therefore lay no claim to such invention.

What I claim as new, and desire to secure by Letters Patent, is—

The combination, with the grated cylinder D and the outer cylinder $G^3$, of the gudgeons E $E^1$, attached, respectively, to the heads $G^1$ $G^2$, the tubular bearings *a a'*, attached centrally to the heads of the drum A, set-screw *b*, and the cranks F F', substantially as and for the purpose set forth.

In testimony that I claim the above I have hereunto subscribed my name in the presence of two witnesses.

HENRY DANIEL STARR.

Attest:

J. D. OWEN,

W. WOOD.